United States Patent
Koifman et al.

(10) Patent No.: US 6,463,094 B2
(45) Date of Patent: *Oct. 8, 2002

(54) POINT-TO-POINT SECURE MODEM AND METHOD

(75) Inventors: Gil Koifman, Petah Tikva (IL); Benjamin Maytal, Mevasseret Zion (IL)

(73) Assignee: Smart Link Ltd., Netanya (IL)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/059,764

(22) Filed: Apr. 14, 1998

(65) Prior Publication Data

US 2001/0043646 A1 Nov. 22, 2001

(51) Int. Cl.[7] ................................................ H04L 9/00
(52) U.S. Cl. ...................................... 375/222; 375/261
(58) Field of Search ............................... 375/261, 265, 375/347, 222; 709/230, 232

(56) References Cited

U.S. PATENT DOCUMENTS

| | | | | |
|---|---|---|---|---|
| 4,439,863 A | * | 3/1984 | Bellamy | 375/290 |
| 4,495,619 A | * | 1/1985 | Acampora | 370/207 |
| 4,894,844 A | * | 1/1990 | Forney, Jr. | 375/269 |
| 5,058,134 A | * | 10/1991 | Chevillat et al. | 375/261 |
| 5,063,574 A | * | 11/1991 | Moose | 375/244 |
| 5,081,649 A | * | 1/1992 | Kennard | 375/261 |
| 5,195,107 A | * | 3/1993 | Wei | 375/290 |
| 5,267,021 A | * | 11/1993 | Ramchandran et al. | 348/469 |
| 5,311,547 A | * | 5/1994 | Wei | 375/290 |
| 5,541,955 A | | 7/1996 | Jacobsmeyer | 375/222 |
| 5,581,578 A | * | 12/1996 | De Bot | 375/261 |
| 5,628,013 A | | 5/1997 | Anderson et al. | 395/677 |
| 5,710,793 A | * | 1/1998 | Greenberg | 375/232 |
| 5,721,922 A | | 2/1998 | Dingwall | 395/673 |
| 5,832,044 A | * | 11/1998 | Sousa et al. | 375/347 |
| 5,953,376 A | * | 9/1999 | Wei | 375/265 |
| 5,970,088 A | * | 10/1999 | Chen | 375/222 |
| 6,092,095 A | * | 7/2000 | Maytal | 709/100 |

* cited by examiner

*Primary Examiner*—Chi Pham
*Assistant Examiner*—Kevin M. Burd
(74) *Attorney, Agent, or Firm*—Eitan, Pearl, Latzer & Cohen-Zedek

(57) ABSTRACT

A modem includes symbol converting unit and processing unit. The symbol converting unit converts between binary data and symbol data in accordance with a first constellation which is a transformed version of a standard constellation and the processing unit process the symbol data for transmission and produce symbol data from received signals. Alternatively, the symbol converting unit has at least two constellations to be selected.

26 Claims, 7 Drawing Sheets

POINT-TO-POINT SECURE MODEM AND METHOD

FIELD OF THE INVENTION

The present invention relates to modems generally and to generally secure point-to-point modems in particular.

BACKGROUND OF THE INVENTION

Personal computers are known in the art and have been widely available for some years. They are becoming more and more popular in the office and at home, especially for communication purposes, whether to send electronic mail, to "surf" the World Wide Web on the Internet or to talk via the Internet. Unfortunately, such actions leave the computer vulnerable to attack from the outside. There are several solutions to the problem, all of which operate at the higher layers of communication.

One solution is a "firewall" which considers a selected connection and determines if such a selection is of the allowable type. If the desired connection is not allowed, the communication is closed. This solution operates at the application layer (layer 7).

Other solutions operate at the presentation, or sixth, layer. One involves data encryption in which all data is encrypted to ensure that, if an unauthorized user receives the data, he cannot understand it. The second solution at this layer utilizes a password. Communication between two modems is only allowed if the user requesting the communication has the correct password.

Callback modems operate at the fifth, or session, layer. These modems provide an initial session in which a requesting user provides his password. The session is then closed and the callback modem "calls back" to the phone number associated with the requesting user whose password was received. If the requesting user is at the phone number, the two modems will communicate. Otherwise, no communication will occur.

All of the above described methods permit a connection to occur and there are still chances that an intruder can break into the system being protected, despite the protection methods.

SUMMARY OF THE PRESENT INVENTION

It is therefore an object of the present invention to provide a modem which attempts to prevent a communication session from being established except between two authorized users.

There is therefore provided, in accordance with a preferred embodiment of the present invention, a modem including a symbol converting unit and a processing unit. The symbol converting unit converts between binary data and symbol data in accordance with a first constellation which is a transformed version of a standard constellation. The processing unit processes the symbol data for transmission and produces symbol data from received signals.

Additionally, in accordance with a preferred embodiment of the present invention, the modem includes a unit for generating the first constellation by placing symbols generally midway between at least two neighboring symbols of the standard constellation.

Moreover, in accordance with a preferred embodiment of the present invention, the transformed constellations are one of the following: translations, rotations and redefinitions of the standard constellations. The transformation can be half the size of a trellis subset. The present invention can include a unit for generating the first constellation by translating the standard constellation by more than half a symbol and also comprising unit for folding the constellation.

Alternatively, in accordance with a preferred embodiment of the present invention, the symbol converting unit can convert between binary data and symbol data in accordance with at least two different constellations. In this embodiment, the symbol converting unit can include a constellation changing unit for determining which constellation, of the at least two constellations, to utilize at any given time.

Moreover, in accordance with a preferred embodiment of the present invention, the modem can include a unit for maintaining the quality of modulation substantially the same as for the original modulation technique.

Furthermore, there is also provided, in accordance with a preferred embodiment of the present invention, a communication system including a host modem and at least one remote modem. The host modem includes a host unit for communicating via a constellation and a host unit for selecting one transformed constellation among a plurality of transformed constellations for use by the host unit for communicating. Each remote modem includes a remote unit for communicating via a constellation and a remote unit for activating the one transformed constellation for use by the remote unit for communicating.

Additionally, in accordance with a preferred embodiment of the present invention, the host unit includes a unit for indicating the selected transformed constellation to the at least one remote modem.

Moreover, in accordance with a preferred embodiment of the present invention, the remote modem includes a unit for identifying the remote modem to the host.

Further, in accordance with a preferred embodiment of the present invention, the host unit for selecting includes a unit for changing the transformed constellation after a predetermined number of symbols have been communicated. The unit for changing typically includes a unit for determining the time to change which typically uses at least one of the following as input: user identification, session duration, time and date.

Finally, the present invention includes the methods performed by the various modems and system described hereinabove.

BRIEF DESCRIPTION OF THE DRAWINGS

The present invention will be understood and appreciated more fully from the following detailed description taken in conjunction with the drawings in which.

DETAILED DESCRIPTION OF PREFERRED EMBODIMENTS

The present invention attempts to prevent an unauthorized user from establishing a physical connection with a "host" computer where, in the present application, the term "host" means the computer to which a requesting user attempts to connect. The present invention can be implemented on both software and hardware modems; the term "modem" herein refers to both types of modems.

Binary data is formed of bits, each representing either a "1" or a "0". For modem operation, a group of consecutive bits are formed into a "symbol" where the number of bits represented by the symbol varies depending on the communication standard being implemented in the specific modem. The V.34 standard has 1664 different symbols and the V.22 standard has only 16 different symbols.

Figure 1:
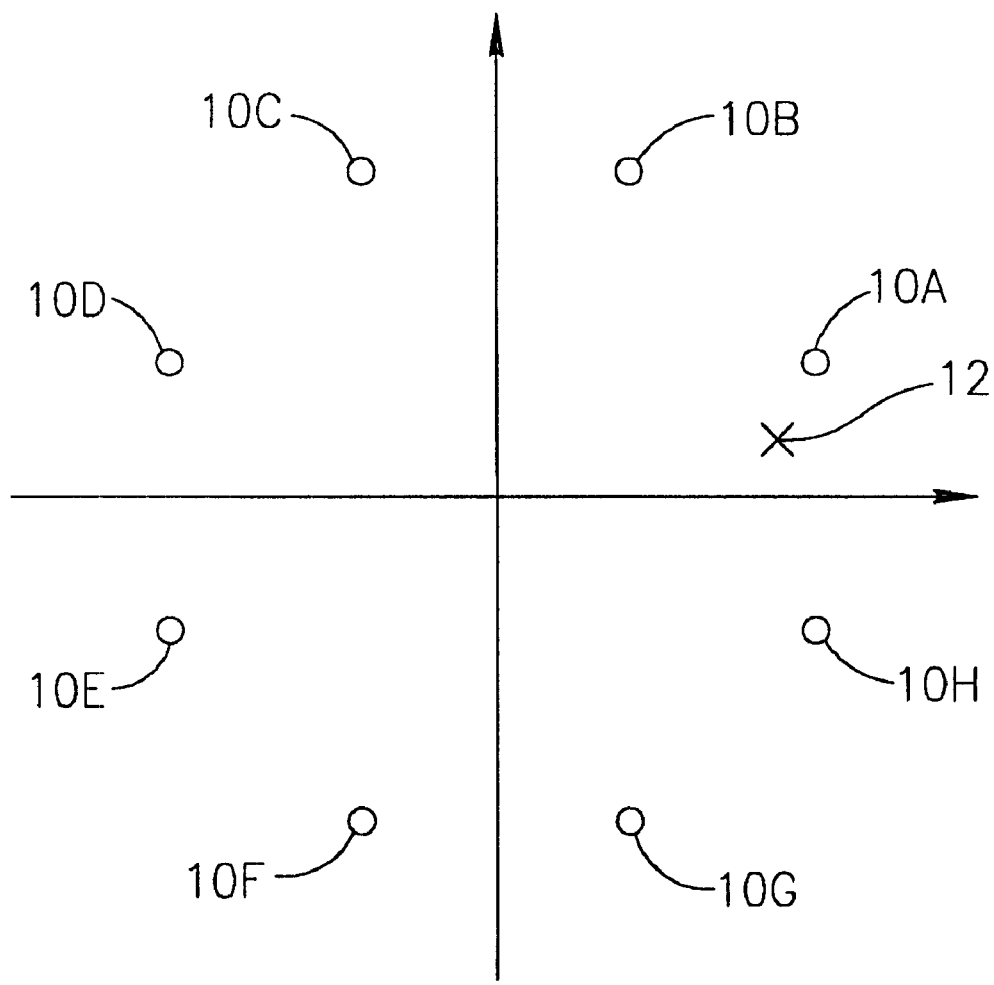
FIG. 1 is a schematic illustration of a prior art modem constellation.

As illustrated generally in FIG. 1, to which reference is now made and which is an amplitude versus phase graph, each symbol 10 represents a separate amplitude and phase combination. The "constellation" shown in FIG. 1 is a representative one having only eight symbols, labeled 10A, 10B, 10C, 10D, 10E, 10F, 10G and 10H. Thus, each symbol of the constellation represents a combination of three bits.

When a modem transmits a symbol, the receiving modem compares the received symbol 12, which is typically corrupted with noise, to the symbols 10 of the constellation. The receiving modem determines the constellation symbol 10 to which the received symbol 12 is closest and produces as output the bit combination represented by the selected constellation symbol 10.

Figure 2:
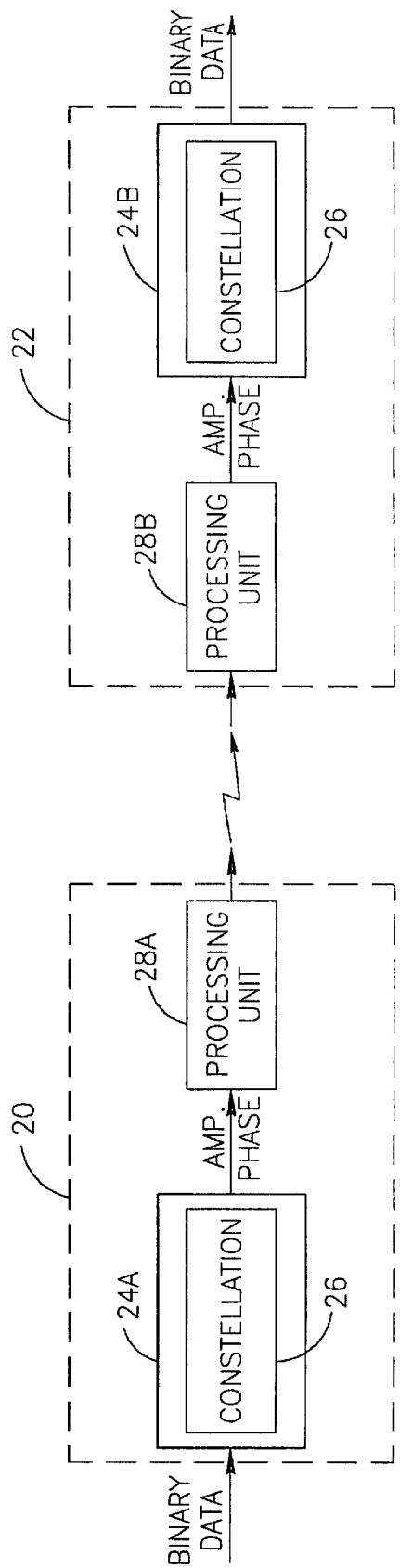
FIG. 2 is a block diagram illustration of two prior art modems communicating.

Reference is now briefly made to FIG. 2 which illustrates two prior art modems 20 and 22 which are communicating. In FIG. 2, modem 20 is the sending modem and modem 22 is the receiving modem. Both modems comprise symbol converting unit 24 utilizing a predefined constellation 26 and a processing unit 28. In sending modem 20, symbol converting unit 24A utilizes constellation 26 to convert the incoming binary data to symbols. Processing unit 28A then generates an analog frequency modulated signal having the requisite amplitudes and phases, thereby transmitting the symbols. Processing unit 28B of receiving modem 22 filters the received, and possibly noisy, analog signal producing therefrom the received symbol. Symbol converting unit 24B then determines to which constellation symbol the received symbol is closest, producing thereby the bit combination represented by the closest constellation symbol.

Figure 3A:
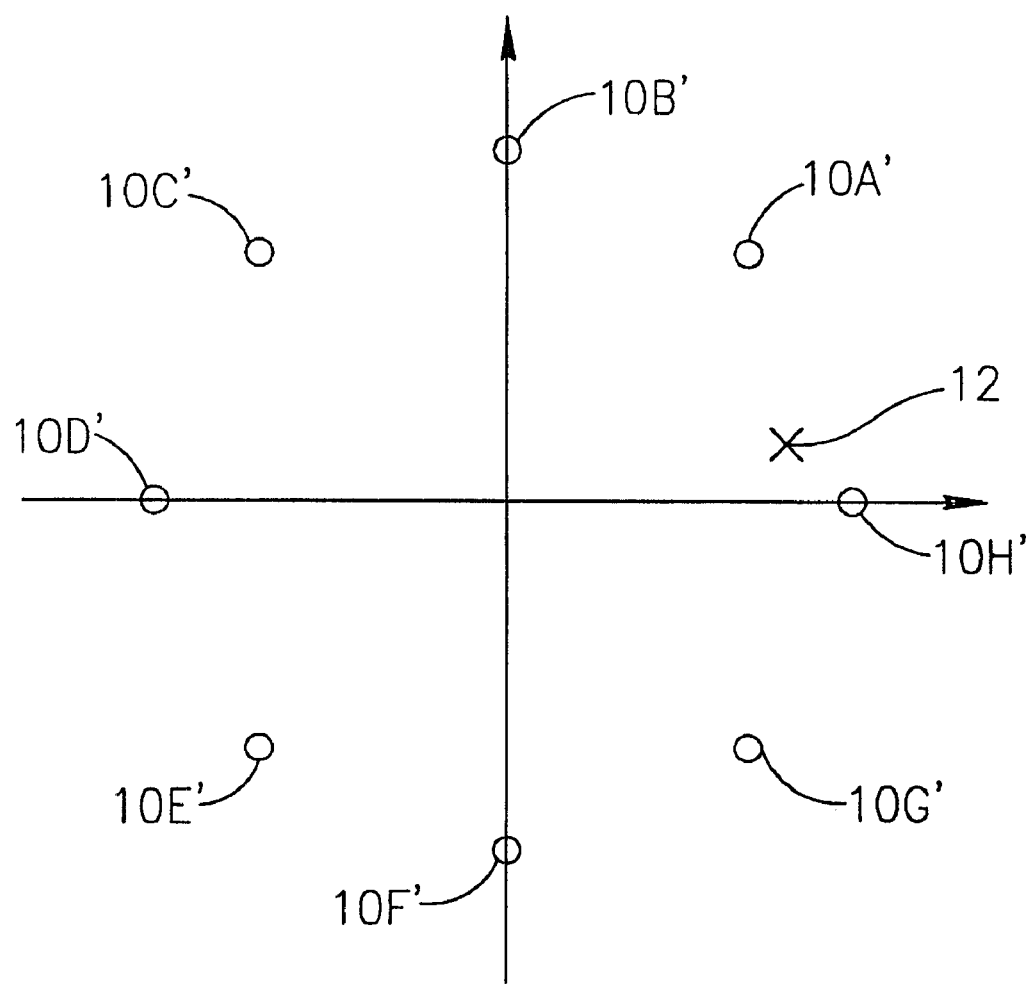
FIG. 3A is a schematic illustration of a rotated version of the constellation of FIG. 1.
Figure 3B:
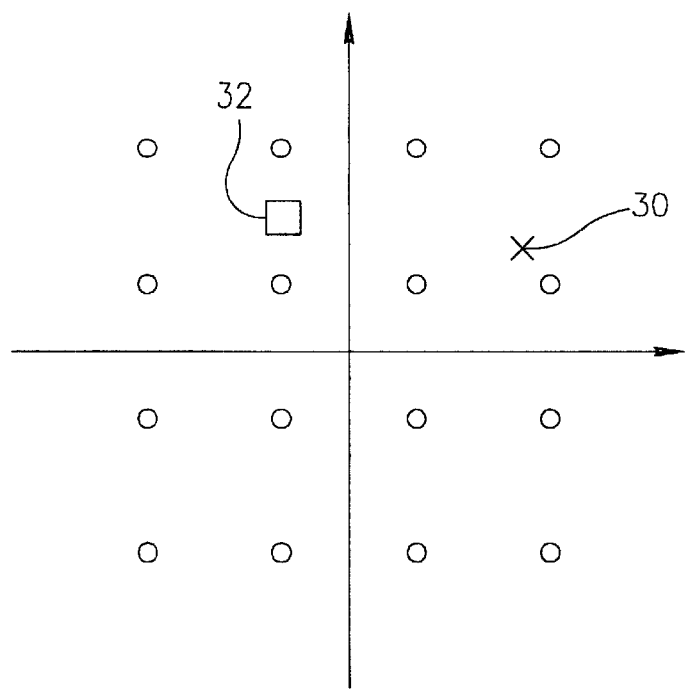
FIG. 3B is a schematic illustration of an exemplary constellation of sixteen symbols.
Figure 3C:
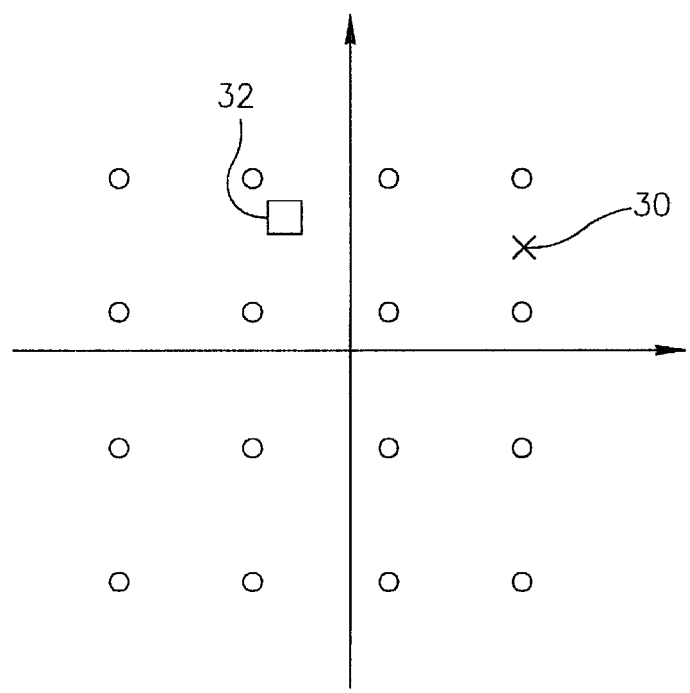
FIG. 3C is a schematic illustration of a translated version of the constellation of FIG. 3B.
Figure 3D:
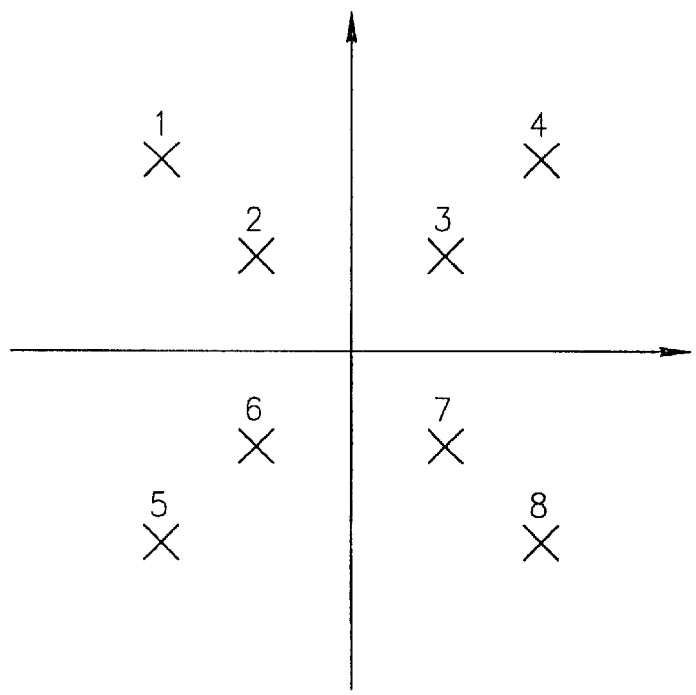
FIG. 3D is a schematic illustration of a first constellation.
Figure 3E:
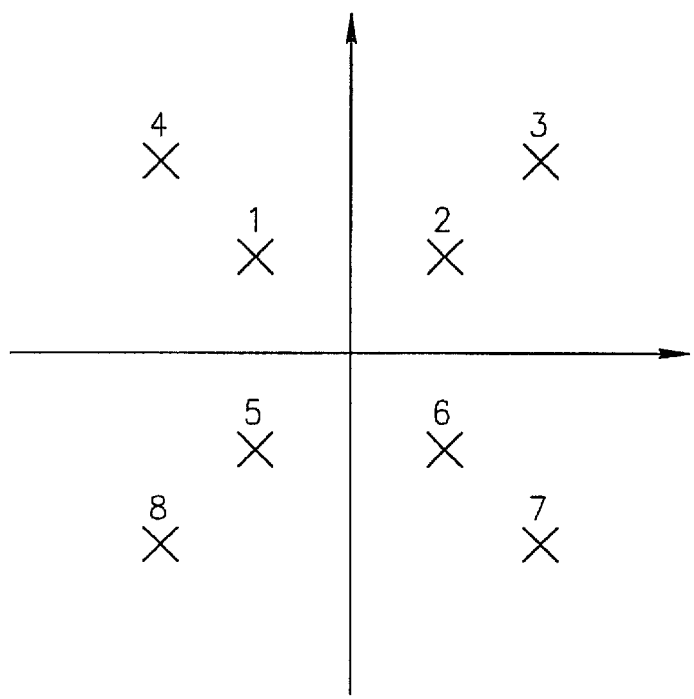
FIG. 3E is a schematic illustration of a translated and folded back version of the constellation of FIG. 3D.
Figure 4:
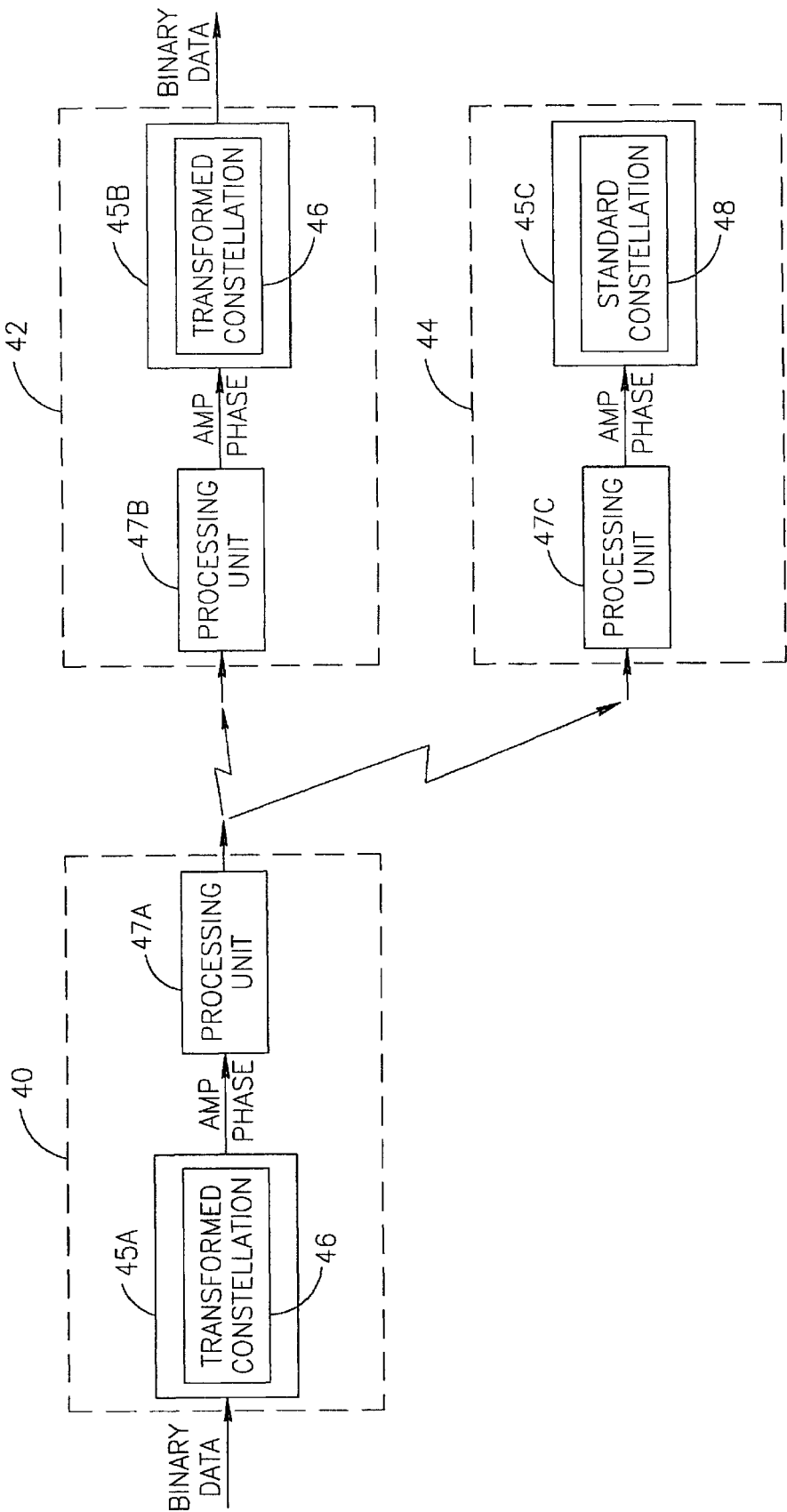
FIG. 4 is a block diagram illustration of a system of two communicating modems and a third modem which cannot communicate therewith.

Reference is now made to FIGS. 3A, 3B, 3C, 3D and 3E and 4 which illustrate a first embodiment of the present invention in which the constellation which is utilized by the sending and receiving modems is a transformed version of a standard constellation. FIG. 3A illustrates a rotated version of the constellation of FIG. 1, FIG. 3B illustrates an exemplary constellation of sixteen symbols and FIG. 3C illustrates a translated version of the constellation of FIG. 3B. FIG. 3D shows a further original constellation and FIG. 3E shows its translation and folding back. FIG. 4 illustrates a system of two communicating modems 40 and 42 and a third modem 42 which cannot communicate.

The constellation of FIG. 3A is a rotated version of the constellation of FIG. 1 and thus, the constellation symbols are labeled 10A', etc. The received symbol 12, produced from the original constellation of FIG. 1, has an amplitude and phase combination which is somewhere between the two rotated symbols 10A' and 10H'. The symbol converting unit of a modem having the constellation of FIG. 3A will not be able to correctly decipher received symbol 12. Similarly, a prior art modem having the constellation of FIG. 1 will not be able to correctly decipher symbols sent from a modem having the constellation of FIG. 3A.

A similar relationship is shown in the constellations of FIGS. 3B and 3C which are separated by a downward translation. A received symbol 30 produced from the constellation of FIG. 3B can be determined by a symbol converting unit having that constellation. However, a symbol converting unit having the constellation of FIG. 3C will not correctly decipher received symbol 30 (produced within the constellation of FIG. 3B) since received symbol 30 is approximately halfway between two constellation symbols. The opposite is true for the received symbol 32 produced from the constellation of FIG. 3C. Symbol 32 is decipherable within the constellation of FIG. 3C and indecipherable within the constellation of FIG. 3B. The translation can be done in each possible direction.

The extent of the transformation (e.g. rotation and/or translation) should be such to place the symbols of the new constellation at least halfway between the symbols of the old constellation. This ensures that a modem with the old constellation will not be able to decipher the received signal since every symbol it receives will be maximally, or close to maximally, noisy. The result will be that the modem will time out and not allow the connection to be made.

Certain modern modems, such as V.34, include "trellis encoding" methods which, at any time, recognize only a portion of the points in the constellation as legal. For example, the portion might be just one-quarter of the constellation such that out of a group of 4 points only one is legal. For such modems, the transformation needs to be of at least half of the trellis basic set, which in V.34 is 4 points.

For a translation of more than half the symbol distance (or trellis group distance), the constellation needs to be "folded" such that the points which were "pushed out" by the translation are added in at the other side. FIG. 3D illustrates the original constellation having eight symbols, labeled 1–8, where symbols 4 and 8 are the rightmost symbols. If the translation is a right shift of 1 symbol to the right, the right column of symbols (symbols 4 and 8) will be shifted out of range. As shown in FIG. 3E, these two symbols 4 and 8 are folded back as the first column of the new constellation.

Typically, the transformed constellations are functions of one standard constellation. Alternatively, for quadrature amplitude modulation (QAM) which has at least 64 different amplitudes and no phase changes, the transformed constellation can utilize the same amplitude levels but can define the symbol associated with the amplitude levels differently. This redefinition of the symbols can also be utilized for standard amplitude and phase constellations rather than, or in addition to, a rotation and/or translation of the location of the symbols.

FIG. 4 illustrates three modems 40, 42 and 44, where modem 40 is a sending modem and modems 42 and 44 are receiving modems. Modems 40, 42 and 44 all comprise symbol converting units, labeled 45A, 45B and 45C, respectively, and processing units 47A, 47B and 47C.

Modems 40 and 42 have a transformed version 46 of a standard constellation such as those of FIGS. 3A and 3B or any other suitable alteration of a standard constellation. For example, for the V.34 standard in which the symbols are separated by 4° of phase and 4 amplitude units whose origin is at the point (1 °, 1 amplitude unit), the transformed constellation might maintain the same separation but have an origin at the point (3 °, 3 amplitude units).

Modem 44, on the other hand, utilizes the standard constellation 48. Because the two constellations 46 and 48 are different, symbol converting unit 45C cannot reasonably decipher the signals sent by sending modem 40 and, therefore, modem 44 will not make a connection to modem 40. This is particularly true if transformed constellation 46 is the transformed version of standard constellation 48.

Thus, the output of modem 42 is binary data while the output of modem 44 is nothing since no connection is made.

It will be appreciated that the communicating modems 40 and 42 need some method of identifying one another before the communication begins. This can be implemented in any of a number of ways, all of which will be evident to a person skilled in the art.

For example, modems perform initialization sessions before beginning communication. An early part of this communication session, which is not transformed, can include the transfer of some identifying feature, such as a unique serial number or user name and password, from the requesting modem to the host modem which must authorize the communication. The host modem can be a central site modem, such as an Internet Service Provider or central office.

Once the host modem has determined that the identifying feature belongs to an allowed modem (this is a high level operation), the host modem sends some indication to the requesting modem to change to the transformed constellation. If the identifying feature is not allowed, the host modem denies access to the requesting modem. If the host modem determines that the other side is not responding properly, the host modem can either continue the initialization session using the transformed constellation, which the other side will not be able to understand and, therefore, will most likely disconnect, or the host modem can initiate the disconnection.

The identifying feature must be registered in the host modem prior to the initiation of communication. Furthermore, the requesting modem must know which identifying feature to utilize. These two conditions require a setup step, providing the two modems with the information they will need to activate the more secure communication.

Figure 5:
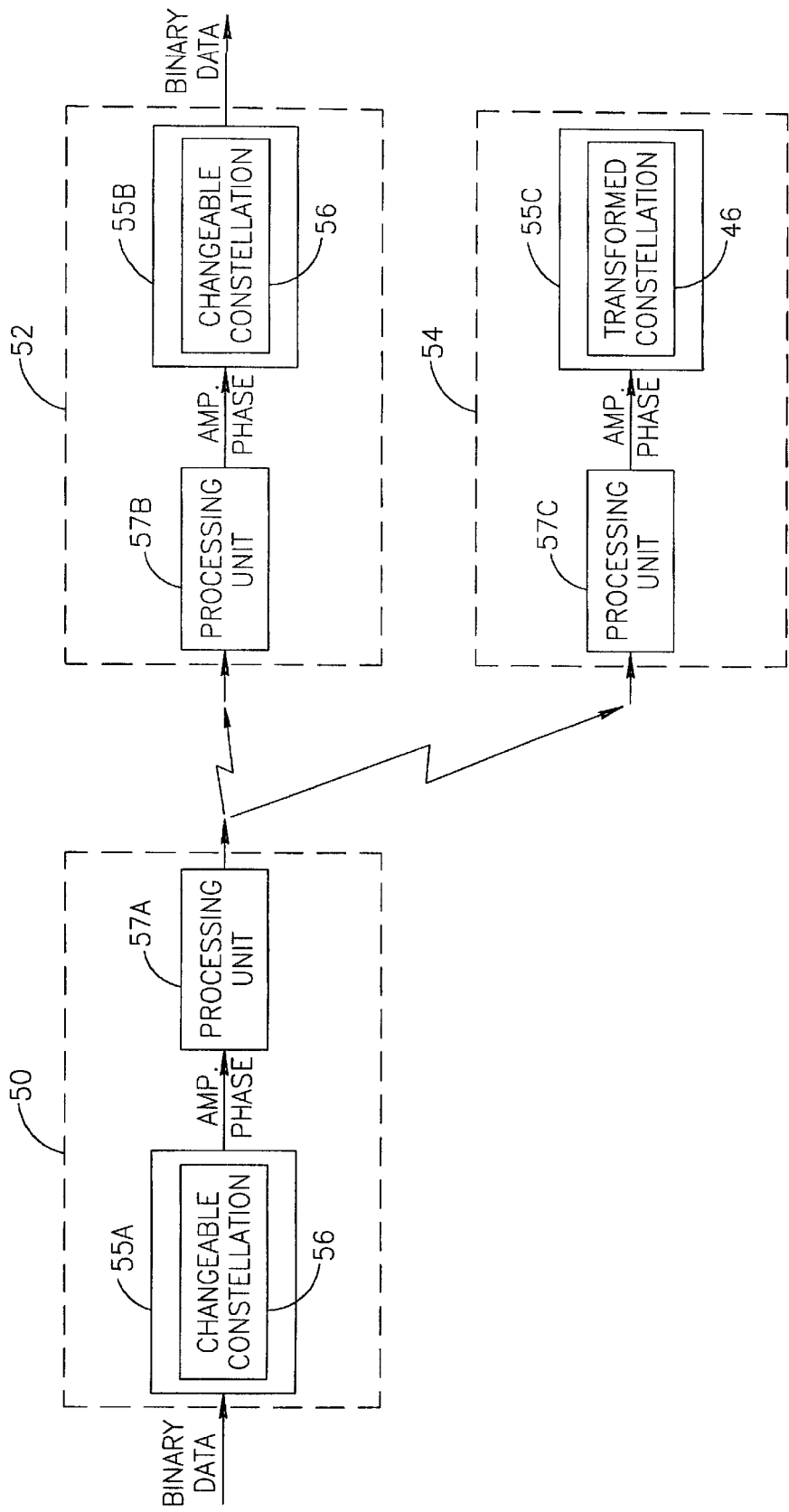
FIG. 5 is a block diagram illustration of an alternative system of two communicating modems, having changing constellations, and a third modem which cannot communicate therewith.

Reference is now made to FIG. 5 which illustrates an alternative embodiment of the present invention in which the symbol converting units of the communicating modems change the constellations being used. FIG. 5 illustrates three modems 50, 52 and 54 where modem 50 is a sending modem and modems 52 and 54 are receiving modems. Modems 50, 52 and 54 all comprise symbol converting units 55A, 55B and 55C and processing units 57A, 57B and 57C.

Symbol converting units 55A and 55B utilize a changeable constellation 56 while modem 54 utilizes either transformed constellation 46 of the previous embodiment or a standard constellation as in the prior art. Changeable constellation 56 is typically one of M constellations, where M is at least two, which change according to a predetermined criterion or function. Since symbol converting units 55A and 55B utilize the same constellation set, modems 50 and 52 can communicate. However, modem 54 cannot even establish a communication since it cannot decipher the symbols sent by modem 50.

If the transformed constellation is atranslation which changes over time, the behavior over time of the changing constellation should be such that the center of gravity of the constellation, over time, remains at zero. For example, the constellation can be moved two symbols to the left for 25% of the time and one symbol to the right for 50% of the time.

Which transformed constellation to change to can be listed in a previously defined schedule of the changes. The new transformed constellation can either be the next constellation in the predefined schedule or it can be selected from the schedule by a function of any desired parameters. The transformed constellations can be defined as translations and rotations from the standard constellation or they can be defined by the points therein. In either case, the number of symbols and the distance between symbols remains constant among the various constellations used by the modems, as long as the line conditions remain constant. As in the prior art, the number of symbols and distance between symbols only change to adjust to the changing line conditions.

The function determining when to change constellations can be every X seconds (i.e. a periodically changing constellation), it can be in accordance with a random number generator or it can be in accordance with some agreed upon signal between the two communicating modems, for example, after receiving a certain symbol or a predetermined sequence of symbols.

Moreover, the function can depend on the number of samples communicated. The number of samples which defines the change period can either be fixed across all modems of this type, or it can be a function of the identifying feature, or of some other parameter(s). For example, the time to change might be a function of the number of sessions which the two modems have already had, or it might be a function of today's date and/or time, or a combination of both, etc.

The decision to change the constellation typically belongs to the host modem who sends an indication to the requesting modem to change to the "next" constellation in X symbols. Both modems then perform the "change the constellation" function, as previously installed therein by either the user or by the modem manufacturer, and the requesting modem sends its results to the host modem. If the results match those of the host modem, then the host modem indicates such and the constellation change occurs at the indicated symbol. If the results do not match, the communication is interrupted.

The functions and parameters for setting the transformation can be different from one modem to the other. In this embodiment, the host modem chooses which transformation to use based, at least in part, on the user id. The remote modem and the host modem need to be coordinated. This can be done either by programming the computer controlling the host modem or periodically over the phone line.

It will be appreciated by persons skilled in the art that the present invention is not limited to what has been particularly shown and described hereinabove. Rather the scope of the present invention is defined only by the claims which follow:

What is claimed is:

1. A modem comprising:
   a symbol converting unit to convert between binary data and symbol data in accordance with a first constellation which is at least a translation of a constellation implementing a communication standard of the International Telecommunication Union; and
   a processing unit to process said symbol data for transmission such that said symbol data is to be transmitted by said modem and to produce symbol data from received signals, wherein a translation of a constellation is defined as a, shift of its symbol points in unison in the horizontal direction, the vertical direction or both.

2. A modem according to claim 1 and comprising means for generating said first constellation by placing symbols in a vicinity of a midpoint between at least two neighboring symbols of said constellation implementing said communication standard.

3. A modem according to claim 1 wherein said first constellation is also a rotation of said constellation implementing said communication standard.

4. A modem according to claim 1 and comprising means for generating said first constellation by translating said constellation implementing said communication standard by at least half a distance between neighboring symbols.

5. A modem according to claim 1 and comprising means for generating said first constellation by translating said constellation implementing said communication standard by at least half the minimum distance of a trellis subset.

6. A modem according to claim 1 wherein said symbol conversion unit comprises means for maintaining a quality of modulation substantially the same as for an original modulation technique.

7. A modem according to claim 1 wherein said first constellation is also a redefinition of said constellation implementing said communication standard.

8. A modem comprising:
   a symbol converting unit to convert between binary data and symbol data in accordance with at least two different constellations each of which is at least a translation of a constellation implementing a communication standard of the International Telecommunication Union; and
   a processing unit to process said symbol data for transmission such that said symbol data is to be transmitted by said modem and to produce symbol data from received signals,
   wherein a translation of a constellation is defined as a shift of its symbol points in unison in the horizontal direction, the vertical direction or both.

9. A modem according to claim 8 and wherein said symbol converting unit comprises constellation changing means for deter which constellation, of said at least two constellations, to utilize at any given time.

10. A modem according to claim 9 wherein said symbol conversion unit comprises means for maintaining a quality of modulation substantially the same as for an original modulation technique.

11. A communication system comprising:
    a host modem comprising:
       host means for communicating via a constellation; and
       host means for selecting one transformed constellation among a plurality of transformed constellations for use by said host means for communicating, wherein each of said plurality of transformed constellations is at least a traction of a constellation implementing a communication standard of the International Telecommunication Union; and
    at least one remote modem, communicating with said host modem, each said remote modem comprising:
       remote means for communicating via a constellation; and
       remote means for activating said one transformed constellation for use by said remote means for communicating,
    wherein a translation of a constellation is defined as a shift of its symbol points in unison in the horizontal direction, the vertical direction or both.

12. A system according to claim 11 and wherein said host means for selecting comprises means for indicating the selected transformed constellation to said at least one remote modem.

13. A system according to claim 11 and also comprising means for identifying the remote modem to the host.

14. A system according to claim 11 and wherein said host means for selecting comprises means for changing the transformed constellation after a predetermined number of symbols have been communicated.

15. A system according to claim 14 and wherein said means for changing comprise means for determining the time to change.

16. A system according to claim 15 and wherein said means for determining the time to change receive at least one of the following as input: user identification, session duration, time and date.

17. A method of communication comprising the steps of:
    converting between binary data and symbol data in accordance with a first constellation which is at least a translation of a constellation implementing a communication standard of the International Telecommunication Union; and
    processing said symbol data for transmission and transmitting said symbol data,
    wherein a translation of a constellation is defined as a shift of its symbol points in unison in the horizontal direction, the vertical direction or both.

18. A method according to claim 17 and comprising the step of generating said first constellation by placing symbols in a vicinity of a midpoint between at least two neighboring symbols of said constellation implementing said communication standard.

19. A method according to claim 17 wherein said first constellation is also a rotation of said constellation implementing said communication standard.

20. A method according to claim 17 and comprising the step of generating said first constellation by translating said constellation implementing said communication standard by at least half a distance between neighboring symbols.

21. A method according to claim 17 and comprising the step of generating said first constellation by translating said constellation implementing said communication standard by at least half the minimum distance of a trellis subset.

22. A method according to 17 claim wherein said first constellation is also a redefinition of said constellation implementing said communication standard.

23. A method of Communication comprising the steps of:
    converting between binary data and symbol data in accordance with at least two different constellations each of which is at least a translation of a constellation implementing a communication standard of the International Telecommunication Union; and
    processing said symbol data for transmission and twitting said symbol data,
    wherein a translation of a constellation is defined as a shift of its symbol points in unison in the horizontal direction, the vertical direction or both.

24. A method according to claim 23 and wherein said step of converting comprises the step of determining which constellation, of said at least two constellations, to utilize at any given time.

25. A method according to claim 24 and also comprising the step of maintaining a quality of modulation substantially the same as for an original modulation technique.

26. A method according to claim 25 and also comprising the step of maintaining a quality of modulation substantially the same as for an original modulation technique.

* * * * *

UNITED STATES PATENT AND TRADEMARK OFFICE
CERTIFICATE OF CORRECTION

PATENT NO. : 6,463,094 B2
DATED : October 8, 2002
INVENTOR(S) : Koifman, Gil et al.

It is certified that error appears in the above-identified patent and that said Letters Patent is hereby corrected as shown below:

Column 3,
Line 23, please replace "versus" with -- and --.

Column 5,
Lines 1-4, please replace the text with -- separated by 4 units and whose constellation origin is at the point (1,1), the transformed constellation might maintain the same separation but have an origin at the point (3,3). --

Signed and Sealed this

Twenty-ninth Day of April, 2003

JAMES E. ROGAN
*Director of the United States Patent and Trademark Office*